Patented Jan. 9, 1940

2,186,370

UNITED STATES PATENT OFFICE 2,186,370

MANUFACTURE OF CYCLOHEXENE

Robert C. Dosser, Midland, Mich., assignor to The Dow Chemical Company, Midland, Mich., a corporation of Michigan No Drawing. Application March 26, 1938, Serial No. 198,273

7 Claims. (Cl. 260—666)

The present invention concerns an improved method for preparing cyclohexene. More particularly it relates to the dehydrohalogenation of a cyclohexyl halide in the presence of an aluminum hydrosilicate.

It is known that cyclohexene may be prepared by heating a cyclohexyl halide with quinoline or alcoholic potash or by passing the vapors of such halide through a tube maintained at a temperature above 300° C. Unfortunately, however, these procedures either require the use of expensive reagents or result in a low yield of impure product and for this reason have never met with commercial acceptance.

I have now discovered that cyclohexene may be prepared in almost quantitative yield and in high purity by heating a cyclohexyl halide together with a small proportion of an aluminum hydrosilicate. The invention, then, consists in the improved method of making cyclohexene hereinafter described and particularly pointed out in the claims.

In carrying out the present invention 100 parts by weight of a cyclohexyl halide, e. g. cyclohexyl chloride or bromide, either pure or accompanied by a substantially non-reactive diluent such as chlorobenzene, and a small proportion, e. g. 0.2 to 20 parts, preferably 1 to 5 parts, of an aluminum hydrosilicate are heated together at a temperature between about 100° and about 200° C., most suitably between 135° C. and 150° C. The heating operation is preferably carried out in such manner as to distill cyclohexene and hydrogen halide from the reaction mixture, but may be conducted under reflux so that the cyclohexene is returned to the reaction zone and the hydrogenhalide is allowed to escape. When reaction is completed, i. e. when evolution of hydrogen halide ceases, the crude cyclohexene is washed with water, and the washed product is fractionally distilled to separate cyclohexene in a pure state.

A wide variety of aluminum hydrosilicates may be employed as catalysts in the dehydrohalogenation of cyclohexyl halides. For example, acid-activated bleaching clays such as those obtainable in commerce under the trade-names Retrol (Superfiltrol), Tonsil, Frankonite, Terrana GBP, or Neutrol 5 are particularly suitable. However, other bleaching clays, e. g. Floridin, fuller's earth, or Japanese earth, and clays such as Afton clay, Bennett Clark #777 clay, china clay, etc., may also be used. The catalytic activity of most clays is increased when the clay has been carefully dried. Since these hydrosilicate catalysts do not appear to lose their activity with use they may advantageously be recovered from one reaction mixture and employed in succeeding mixtures.

It will be appreciated that dehydrohalogenation according to my new process may if desired be carried out either at super-atmospheric or reduced pressures. However, an important advantage of the present invention is that it permits preparation of cyclohexene at atmospheric pressure and at only moderately elevated temperatures. By operating under the preferred conditions last stated, the disadvantages of operation at high temperatures and/or high pressures are avoided, and the dehydrohalogenation may be conducted in simple and convenient apparatus in either batchwise or continuous manner.

The following example illustrates one way in which the principle of the invention has been employed but is not to be considered as limiting the scope thereof:

Example

An initial mixture of 100 parts by weight of cyclohexyl chloride and 12 parts of Retrol (an acid-activated bleaching clay) was charged into a reactor and heated to the boiling point of the cyclohexyl chloride (142° C.). At such temperature reaction occurred rapidly and cyclohexene, hydrogen chloride and some unreacted cyclohexyl chloride volatilized from the reaction mixture. These mixed vapors were led into a fractionating column, the cyclohexyl chloride being separated out and returned to the reaction zone, and the cyclohexene and hydrogen chloride withdrawn and condensed. Additional cyclohexyl chloride was added continuously to the reaction mixture in a quantity approximately equivalent to the cyclohexene being withdrawn, until a total of 406 parts by weight had been added. Heating was continued until evolution of hydrogen chloride stopped. The cyclohexene-hydrogen chloride condensate was then washed with water to remove hydrogen chloride, and the washed product was fractionally distilled to separate cyclohexene in a pure state. According to this procedure 506 parts of cyclohexyl chloride were converted into 312 parts of cyclohexene, a quantity corresponding to 89 per cent of the theoretical yield.

Other modes of applying the principle of the invention may be employed instead of those explained, change being made as regards the details hereinbefore disclosed, provided the step or steps stated in any of the following claims or the equivalent of such stated step or steps be employed.

I therefore particularly point out and distinctly claim as my invention:

1. The process of preparing cyclohexene which comprises heating a cyclohexyl halide in the presence of an aluminum hydrosilicate bleaching clay.

2. The process of preparing cyclohexene which comprises heating cyclohexyl chloride in the presence of an aluminum hydrosilicate bleaching clay.

3. The process which comprises heating a mixture of a cyclohexyl halide and an aluminum hydrosilicate bleaching clay to a temperature at which hydrogen halide is vaporized therefrom.

4. The process which comprises heating a mixture of a cyclohexyl halide and an aluminum hydrosilicate bleaching clay to a temperature at which hydrogen halide and cyclohexene are vaporized therefrom, and condensing the cyclohexene.

5. The process of preparing cyclohexene which comprises heating cyclohexyl chloride in the presence of a small proportion of an aluminum hydrosilicate bleaching clay at a temperature between about 100° C. and about 200° C.

6. The process which comprises heating a mixture of a cyclohexyl halide and an acid activated aluminum hydrosilicate bleaching clay to a temperature at which hydrogen halide is vaporized therefrom.

7. The process of preparing cyclohexene which comprises heating cyclohexyl chloride in the presence of between about 1 and about 5 parts by weight of an acid activated aluminum hydrosilicate bleaching clay per 100 parts of cyclohexyl chloride at a temperature between about 135° C. and about 150° C.

ROBERT C. DOSSER.